United States Patent
Kim et al.

(10) Patent No.: US 10,734,878 B2
(45) Date of Patent: Aug. 4, 2020

(54) SPHERICAL WHEEL MOTOR AND CONTROL SYSTEM THEREOF

(71) Applicant: ELECTRONICS AND TELECOMMUNICATIONS RESEARCH INSTITUTE, Daejeon (KR)

(72) Inventors: Minki Kim, Daejeon (KR); Junbo Park, Seoul (KR); Dong Yun Jung, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 121 days.

(21) Appl. No.: 16/122,631

(22) Filed: Sep. 5, 2018

(65) Prior Publication Data
US 2019/0097513 A1    Mar. 28, 2019

(30) Foreign Application Priority Data

Sep. 27, 2017  (KR) .................. 10-2017-0125504
Mar. 13, 2018  (KR) .................. 10-2018-0029419
Jul. 5, 2018    (KR) .................. 10-2018-0078388

(51) Int. Cl.
  *H02K 41/00*    (2006.01)
  *H02K 41/03*    (2006.01)
  (Continued)

(52) U.S. Cl.
  CPC .............. *H02K 41/03* (2013.01); *H02K 1/12* (2013.01); *H02K 1/22* (2013.01); *H02P 6/16* (2013.01); *H02P 6/28* (2016.02); *H02K 2201/18* (2013.01)

(58) Field of Classification Search
  CPC ........ H02K 41/03; H02K 41/031; H02K 1/22; H02K 1/223; H02K 1/27; H02K 2201/18
  (Continued)

(56) References Cited

U.S. PATENT DOCUMENTS 5,413,010 A * 5/1995 Nakanishi ......... B01F 15/00435
                                                    310/156.38
5,476,018 A * 12/1995 Nakanishi ......... B01F 15/00435
                                                    74/5.46
(Continued)

FOREIGN PATENT DOCUMENTS

KR     10-0954772 B1     4/2010
KR     10-2013-0051101 A 5/2013
(Continued)

OTHER PUBLICATIONS

Masaaki Kumagai et al., "Development and Control of a Three DOF Spherical Induction Motor", 2013 IEEE International Conference on Robotics and Automation (ICRA), May 6-10, 2013, pp. 1520-1525, IEEE, Karlsruhe, Germany.

*Primary Examiner* — Maged M Almawri

(57) ABSTRACT

The present disclosure relates to a spherical wheel motor and a control system thereof, and more particularly, the spherical wheel motor and the control system include a spherical rotor and a stator surrounding an upper surface of the rotor. The rotor includes a spherical outer shell part, a first axial magnet extending in a horizontal direction in the outer shell part, a second axial magnet extending in the horizontal direction and facing the first axial magnet, and a rotary magnet belt provided in a form of a belt with the first axial magnet and the second axial magnet as a central axis. The rotary magnet belt includes a plurality of first rotary magnets and a plurality of second rotary magnets arranged alternately.

20 Claims, 20 Drawing Sheets

(51) Int. Cl.
    *H02P 6/16*     (2016.01)
    *H02K 1/12*     (2006.01)
    *H02K 1/22*     (2006.01)
    *H02P 6/28*     (2016.01)

(58) Field of Classification Search
    USPC .................... 301/261.1–271, 156.01–156.78
    See application file for complete search history.

(56) References Cited

U.S. PATENT DOCUMENTS

| | | | | |
|---|---|---|---|---|
| 5,798,590 | A * | 8/1998 | Sakakibara | H02K 41/031 310/156.19 |
| 6,906,441 | B2 * | 6/2005 | Mendenhall | H02K 41/03 310/112 |
| 7,446,449 | B2 * | 11/2008 | Laing | H02K 1/14 310/216.067 |
| 7,484,941 | B2 * | 2/2009 | Laing | F04D 29/0467 417/423.7 |
| 7,675,208 | B2 * | 3/2010 | Bandera | H02K 7/14 310/254.1 |
| 7,791,233 | B1 * | 9/2010 | Attard | H02K 21/28 310/116 |
| 8,080,911 | B2 * | 12/2011 | Won | H02K 41/03 310/254.1 |
| 8,179,007 | B2 * | 5/2012 | Van Der Walt | F16M 11/14 310/90.5 |
| 9,000,628 | B1 * | 4/2015 | Ho | H02K 41/031 310/36 |
| 9,178,393 | B2 * | 11/2015 | Yano | H02K 41/031 |
| 9,391,481 | B2 * | 7/2016 | Kim | H02K 5/04 |
| 9,853,528 | B2 * | 12/2017 | Hollis, Jr. | H02K 41/025 |
| 10,110,108 | B2 * | 10/2018 | Bandera | H02K 33/12 |
| 2002/0167235 | A1 * | 11/2002 | Long | A63H 33/26 310/80 |
| 2013/0113307 | A1 * | 5/2013 | Kim | H02K 5/04 310/40.5 |
| 2013/0127285 | A1 * | 5/2013 | Yano | H02K 41/031 310/156.43 |
| 2013/0151043 | A1 | 6/2013 | Jung | |
| 2014/0159625 | A1 | 6/2014 | Oh et al. | |

FOREIGN PATENT DOCUMENTS

| | | |
|---|---|---|
| KR | 10-1284338 B1 | 7/2013 |
| KR | 10-1372392 B1 | 3/2014 |

\* cited by examiner

SPHERICAL WHEEL MOTOR AND CONTROL SYSTEM THEREOF

CROSS-REFERENCE TO RELATED APPLICATIONS

This U.S. non-provisional patent application claims priority under 35 U.S.C. § 119 of Korean Patent Application Nos. 10-2017-0125504, filed on Sep. 27, 2017, and 10-2018-0029419, filed on Mar. 13, 2018, and 10-2018-0078388 filed on Jul. 5, 2018, the entire contents of which are hereby incorporated by reference.

BACKGROUND

The present disclosure herein relates to a spherical wheel motor and a control system thereof, and more particularly, to a spherical wheel motor including a rotary magnet and an axial magnet and a control system thereof.

Reaches on a technology of a three-dimensional motor having a free rotation capability are being actively conducted. Firstly, there is a method for driving a sphere using a plurality of typical motors having axes. A ball-bot or ball-pin tire which drives a sphere by mounting multiple motors on the outside of the sphere was developed, and Sphero which drives a sphere by installing a typical motor having an axis in the sphere was developed. Secondly, there is a method of using a multi-degree-of-freedom motor in which a permanent magnet is used. A joint robot capable of degree-of-freedom movement and a permanent-magnet-type multi-degree-of-freedom motor capable of controlling a posture for a robot have been developed. Thirdly, there is a spherical wheel motor using an induction method. A spherical induction motor in which the surface of a sphere includes a metal conduction layer and a coil and an inverter are configured as a structure has been developed.

SUMMARY

The present disclosure provides a special wheel motor having excellent rotational motion force and rotational controllability.

An embodiment of the inventive concept provides a spherical wheel motor including: a spherical rotor; and a stator surrounding an upper surface of the rotor, wherein the rotor includes a spherical outer shell part, a first axial magnet extending in a horizontal direction in the outer shell part, a second axial magnet extending in the horizontal direction and facing the first axial magnet, and a rotary magnet belt provided in a form of a belt with the first axial magnet and the second axial magnet as a central axis, wherein the rotary magnet belt includes a plurality of first rotary magnets and a plurality of second rotary magnets arranged alternately, wherein the stator includes a base surrounding the upper surface of the rotor and coil belts provided in plurality on the base to intersect with each other on an uppermost part of the base, wherein the coil belts include a plurality of coils.

In an embodiment, the rotor may further include an interposed part in the outer shell part, and the interposed part may include the same material as the outer shell part.

In an embodiment, the rotor may further include an interposed part in the outer shell part, and the interposed part may be a substantially empty space.

In an embodiment, the first axial magnet and the second axial magnet may contact each other.

In an embodiment, each of the first rotary magnets and each of the second rotary magnets may contact each other.

In an embodiment, each of the coil belts may include a first coil and a second coil positioned at both ends thereof, an uppermost part of the first coil and an uppermost part of the second coil may be positioned at higher levels than an uppermost part of the first axial magnet and an uppermost part of the second axial magnet, and a lowermost part of the first coil and a lowermost part of the second coil may be positioned at lower levels than a lowermost part of the first axial magnet and a lowermost part of the second axial magnet.

In an embodiment, each of the coil belts may include a third coil on the uppermost part of the base.

In an embodiment, the rotor and the stator may be separated from each other.

In an embodiment, the spherical wheel motor may further include a bearing provided between the rotor and the stator.

In an embodiment, the spherical wheel motor may further include a position detector connected to the first coil or the second coil.

In an embodiment, the first axial magnet may be an N-pole magnet, and the second axial magnet may be an S-pole magnet.

In an embodiment, each of the first rotary magnets may be an N-pole magnet, and each of the second rotary magnets may be an S-pole magnet.

In an embodiment of the inventive concept, a spherical wheel motor includes: a spherical rotor; and a stator surrounding an upper surface of the rotor, wherein the rotor includes a spherical outer shell part, a first axial magnet extending in a horizontal direction in the outer shell part, a second axial magnet extending in the horizontal direction and facing the first axial magnet in the outer shell part, and a rotary magnet belt provided in a form of a belt with the first axial magnet and the second axial magnet as a central axis in the outer shell part, wherein the rotary magnet belt includes a plurality of first rotary magnets and a plurality of second rotary magnets arranged alternately, wherein the stator includes: a base surrounding the upper surface of the rotor; and coil belts provided in plurality on the base, wherein the coil belts include a plurality of coils.

In an embodiment, the base may include a base opening provided to an uppermost part of the base.

In an embodiment, the spherical wheel motor may further include position detectors provided on a sidewall of the base exposed through the base opening.

In an embodiment, the position detectors may be arranged so as to correspond to directions in which the coils adjacent to the base opening are arranged.

In an embodiment, the spherical wheel motor may further include a rotation detector including a disk contacting the outer shell part through the base opening.

In an embodiment, the disk may be capable of rotating in a first direction with an axis parallel with a circumferential surface of the disk as a central axis, the rotation detector may further include a first encoder provided beside the disk, and the first encoder may detect the rotation of the disk in the first direction to obtain rotation information.

In an embodiment, the disk may be capable of rotating in a second direction intersecting with the first direction, the rotation detector may further include a second encoder provided on the disk, and the second encoder may detect the rotation of the disk in the second direction to obtain rotation information.

In an embodiment, the rotation detector may further include a connection part connecting the disk and the second encoder, and the disk may be provided between portions of the connection part.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
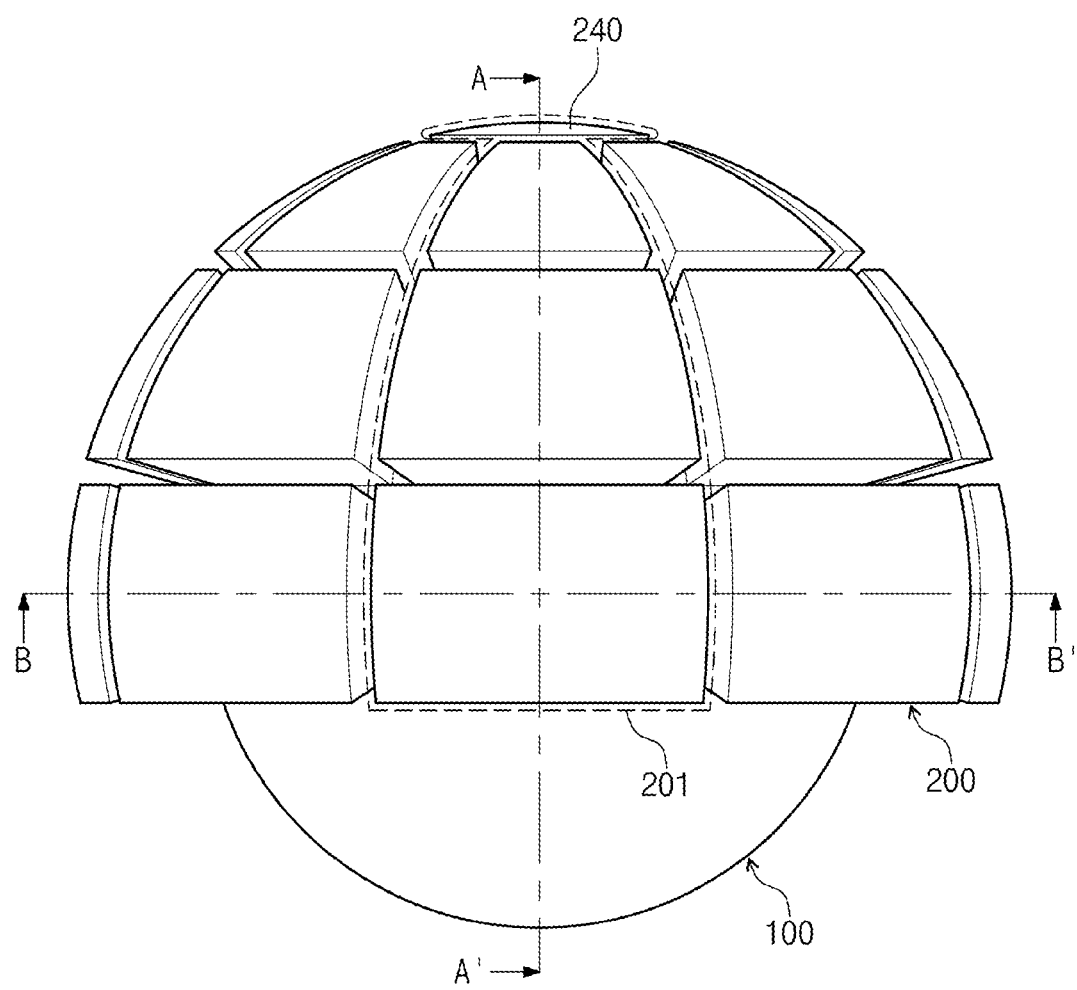
FIG. 1A is a front view of a spherical wheel motor according to an embodiment of the inventive concept.

Advantages and features of embodiments of the inventive concept, and implementation methods thereof will be clarified through the following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by the scope of claims. Like reference numerals refer to like elements throughout.

The terminology used herein is not for delimiting the embodiments of the inventive concept but for describing the embodiments. The terms of a singular form may include plural forms unless otherwise specified. The term "include," "comprise," "including" or "comprising" specifies an element, a step, an operation and/or a device but does not exclude other elements, steps, operations and/or devices.

Hereinafter, embodiments of the inventive concept will be described in detail.

Figure 1B:
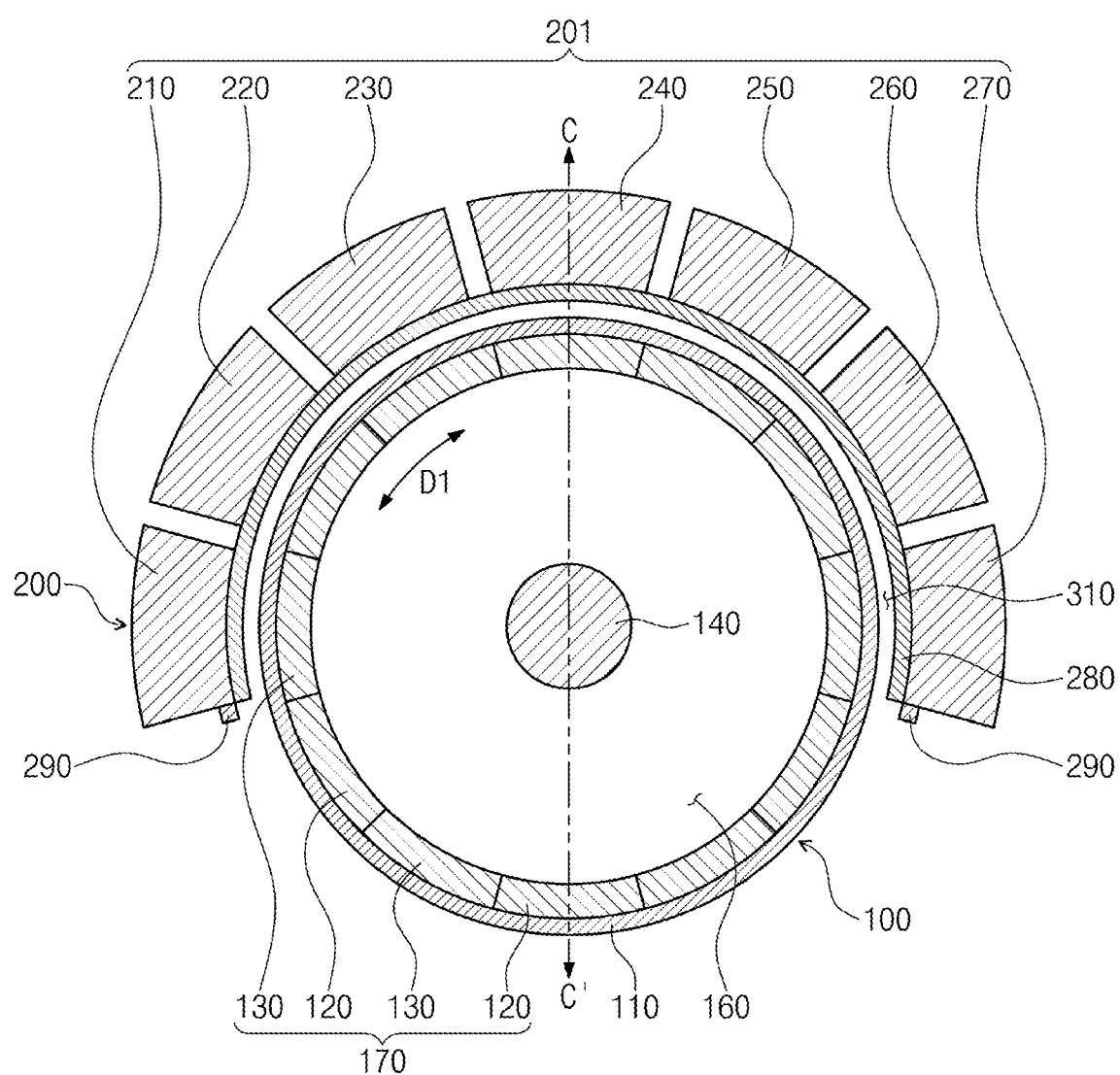
FIG. 1B is a cross-sectional view of the spherical wheel motor taken along line A-A' of FIG. 1A.
Figure 1C:
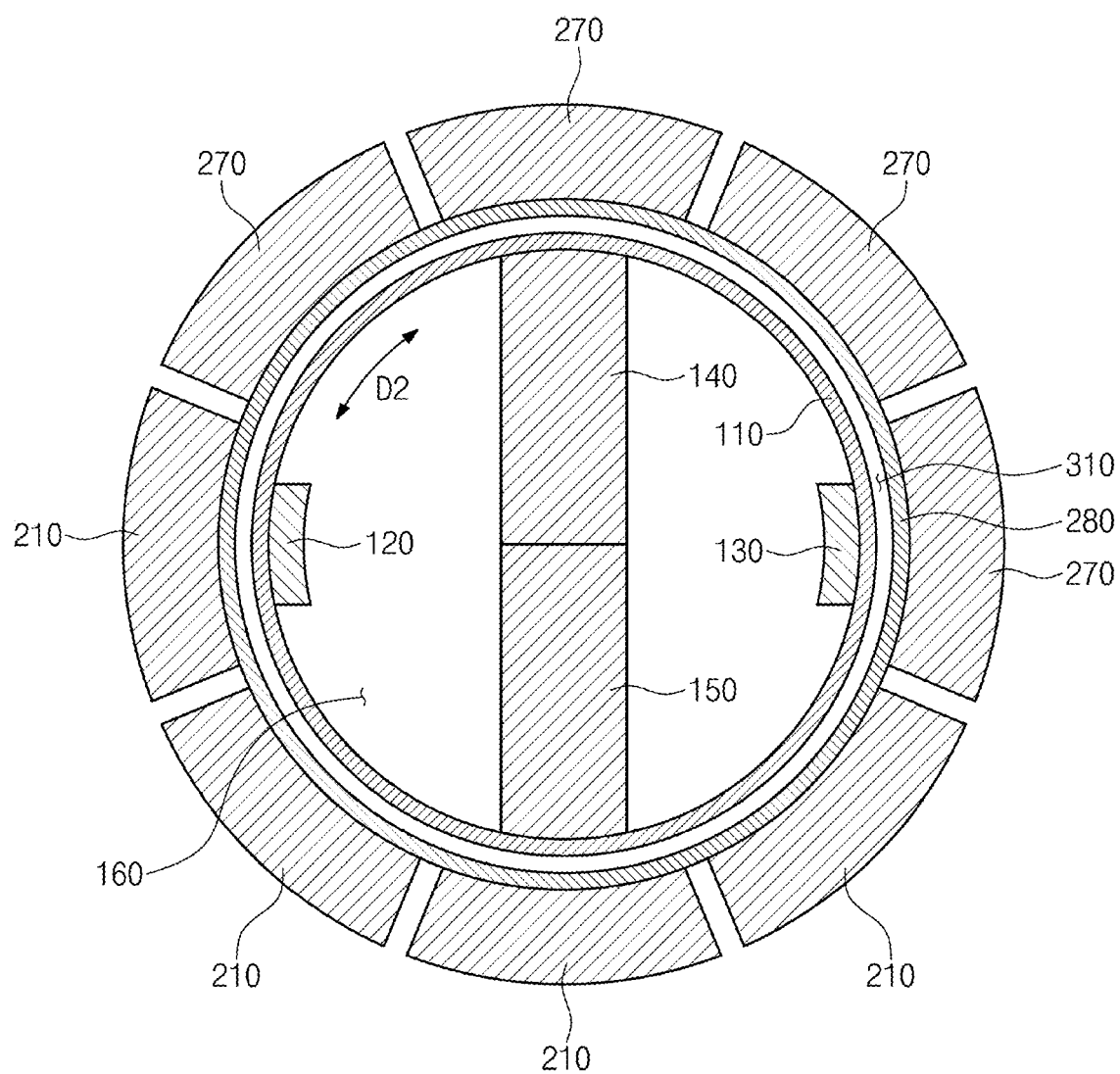
FIG. 1C is a cross-sectional view of the spherical wheel motor taken along line B-B' of FIG. 1A.
Figure 2:
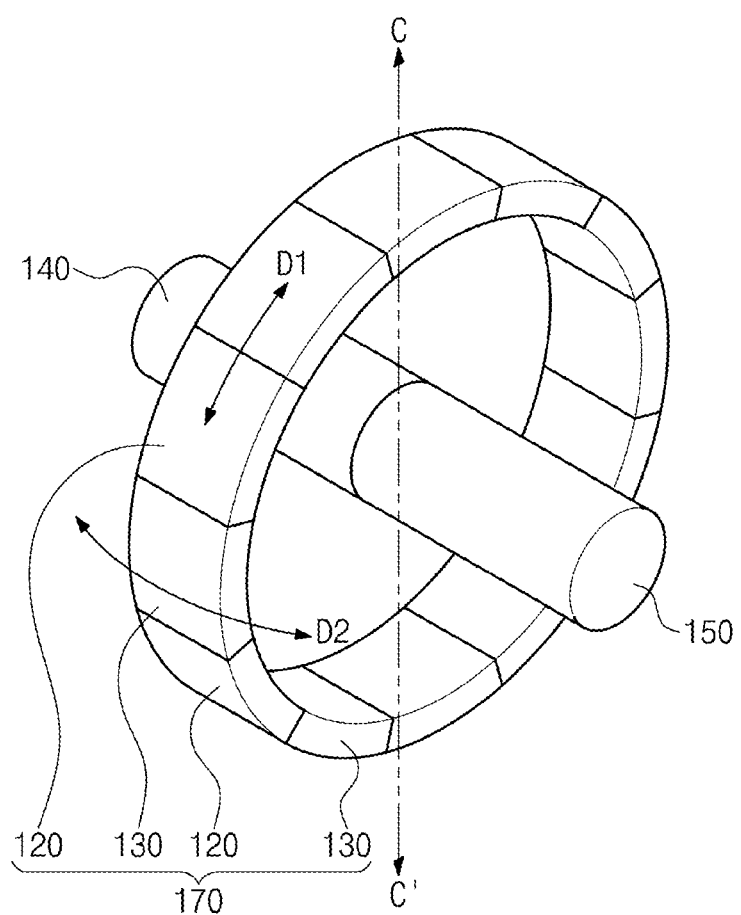
FIG. 2 is a diagram illustrating a rotary magnet belt and axial magnets.

FIG. 1A is a front view of a spherical wheel motor according to an embodiment of the inventive concept, FIG. 1B is a cross-sectional view of the spherical wheel motor taken along line A-A' of FIG. 1A, FIG. 1C is a cross-sectional view of the spherical wheel motor taken along line B-B' of FIG. 1A, and FIG. 2 is a diagram illustrating a rotary magnet belt and axial magnets.

Referring to FIGS. 1A to 1C and 2, the spherical wheel motor according to an embodiment of the inventive concept may include a rotor 100 and a stator 200. The rotor 100 may have a spherical shape. A surface of the rotor 100 may be divided into an upper surface and a lower surface with respect to a center of the rotor 100. The stator 200 may surround the upper surface of the rotor 100.

The rotor 100 may include an outer shell part 110, a rotary magnet belt 170, a first axial magnet 140, a second axial magnet 150, and an interposed part 160. The outer shell part 110 may have a hollow spherical shape. In other words, the outer shell part 110 may form the surface of the rotor 100. The first axial magnet 140 and the second axial magnet 150 may be provided in the outer shell part 110. The first axial magnet 140 and the second axial magnet 150 may extend in a horizontal direction. The first axial magnet 140 and the second axial magnet 150 may extend, facing each other. One end of the first axial magnet 140 may contact the outer shell part 110. One end of the second axial magnet 150 may contact the outer shell part 110. For example, the ends of the first and second axial magnets 140 and 150 may be curved to conform to an inner surface of the outer shell part 110. For another example, the ends of the first and second axial magnets 140 and 150 be planar. In this case, planar recesses conforming to the ends may be provided in the inner surface of the outer shell part 110, and the ends may contact the recesses. As shown, the first axial magnet 140 and the second axial magnet 150 may contact each other. Otherwise, the first axial magnet 140 and the second axial magnet 150 may be separated from each other. In the case where the first axial magnet 140 and the second axial magnet 150 are separated from each other, a connection element (not shown) may be provided between the first axial magnet 140 and the second axial magnet 150. For example, the first axial magnet 140 may be an N-pole magnet, and the second axial magnet 150 may be an S-pole magnet. For another example, the first axial magnet 140 may be an S-pole magnet, and the second axial magnet 150 may be an N-pole magnet. The first axial magnet 140 and the second axial magnet 150 may have a cylindrical shape.

The rotary magnet belt 170 may be provided in the outer shell part 110. The rotary magnet belt 170 may be provided in a form of a belt with the first axial magnet 140 and the second axial magnet 150 as a central axis. In other words, the rotary magnet belt 170 may be provided in a form of a belt with the first axial magnet 140 and the second axial magnet 150 as a central axis. The rotary magnet belt 170 may surround side surfaces of the first axial magnet 140 and the second axial magnet 150. The rotary magnet belt 170 may include a plurality of first rotary magnets 120 and a plurality of second rotary magnets 130. Although the number of the first rotary magnets 120 and the number of the second rotary magnets 130 are illustrated as six, an embodiment of the inventive concept may not be limited thereto. The first rotary magnets 120 and the second rotary magnets 130 may be alternately arranged. In other words, the first rotary magnets 120 and the second rotary magnets 130 may be alternately connected to provide the rotary magnet belt 170. The rotary magnet belt 170 may contact the outer shell part 110. The rotary magnet belt 170 may be separated from the first axial magnet 140 and the second axial magnet 150. For example, the first rotary magnets 120 may be N-pole magnets, and the second rotary magnets 130 may be S-pole magnets. For another example, the first rotary magnets 120 may be S-pole magnets, and the second rotary magnets 130 may be N-pole magnets. As shown, each of the first rotary magnets 120 may contact each of the second rotary magnets 130. Otherwise, each of the first rotary magnets 120 may be separated from each of the second rotary magnets 130. In the case where each of the first rotary magnets 120 is separated from each of the second rotary magnets 130, a connection element (not shown) may be provided between each of the first rotary magnets 120 and each of the second rotary magnets 130.

The interposed part 160 may be provided in the outer shell part 110. For example, the interposed part 160 may be a substantially empty space in the outer shell part 110. For another example, the interposed part 160 may include a solid phase material filling a space in the outer shell part 110. In this case, the interposed part 160 may include the same material as the outer shell part 110.

The stator 200 may include a base 280 and coil belts 201. The base 280 may surround the upper surface of the rotor 100. In other words, the base 280 may surround an upper surface of the outer shell part 110. An upper surface of the base 280 may have a shape that is similar to the shape of the upper surface of the outer shell part 110.

The plurality of coil belts 201 may be provided on the base 280. The coil belts 201 may have an arc shape. Each coil belt 201 may be arranged across the upper surface of the base 280. The coil belts 201 may overlap each other on an uppermost part of the base 280. In other words, the coil belts 201 may intersect with each other on the uppermost part of the base 280. Although the number of the coil belts 201 is illustrated as four, an embodiment of the inventive concept may not be limited thereto.

Each coil belt 201 may include first to seventh coils 210, 220, 230, 240, 250, 260, and 270 linearly arranged in a planar view. The first to seventh coils 210 to 270 may be sequentially provided on the base 280. The first coil 210 and the seventh coil 270 may be positioned at both ends of each coil belt 201. An uppermost part of the first coil 210 and an uppermost part of the seventh coil 270 may be positioned at higher levels than an uppermost part of the first axial magnet 140 and an uppermost part of the second axial magnet 150, and a lowermost part of the first coil 210 and a lowermost part of the seventh coil 270 may be positioned at lower levels than a lowermost part of the first axial magnet 140 and a lowermost part of the second axial magnet 150. The fourth coil 240 may be provided to an uppermost part of the stator 200. In other words, the fourth coil 240 may be provided on the uppermost part of the base 280. The coil belts 201 may overlap each other with respect to the fourth coil 240. In other words, the single fourth coil 240 may be included in the plurality of coil belts 201. The second coil 220 and the third coil 230 may be provided between the first coil 210 and the fourth coil 240. The fifth coil 250 and the sixth coil 260 may be provided between the fourth coil 240 and the seventh coil 270. As shown, the first to seventh coils 210 to 270 may be spaced apart from each other. Otherwise, the first to seventh coils 210 to 270 may contact each other. Although the single coil belt 201 is illustrated as including the seven coils, i.e., the first to seventh coils 210 to 270, the number of coils may not be limited thereto. Each of the first to seventh coils 210 to 270 may include a ferrite coil.

Position detectors 290 connected to each first coil 210 or each seventh coil 270 may be provided. The position detectors 290 may detect a position of the rotor 100. The position detectors 290 may be Hall sensors or mouse sensors.

The stator 200 and the rotor 100 may be separated from each other. In other words, a separation space 310 may be provided between the stator 200 and the rotor 100. For example, the rotor 100 may be separated from the stator 200 by virtue of magnetic levitation. For another example, a bearing may be provided to the separation space 310.

The rotor 100 of the spherical wheel motor according to an embodiment of the inventive concept may rotate in a first direction D1 with the first axial magnet 140 and the second axial magnet 150 as a central axis. Furthermore, the rotor 100 may rotate in a second direction D2 with a vertical axis C-C' as a central axis.

The spherical wheel motor according to an embodiment of the inventive concept may have improved rotational motion force and rotational controllability in comparison with a typical technology. The spherical wheel motor may have excellent rotational motion force since the rotary magnet belt 170 includes the plurality of first rotary magnets 120 and the plurality of second rotary magnets 130. The spherical wheel motor may have excellent rotational controllability since the first axial magnet 140 and the second axial magnet 150 are included therein.

Figure 3:
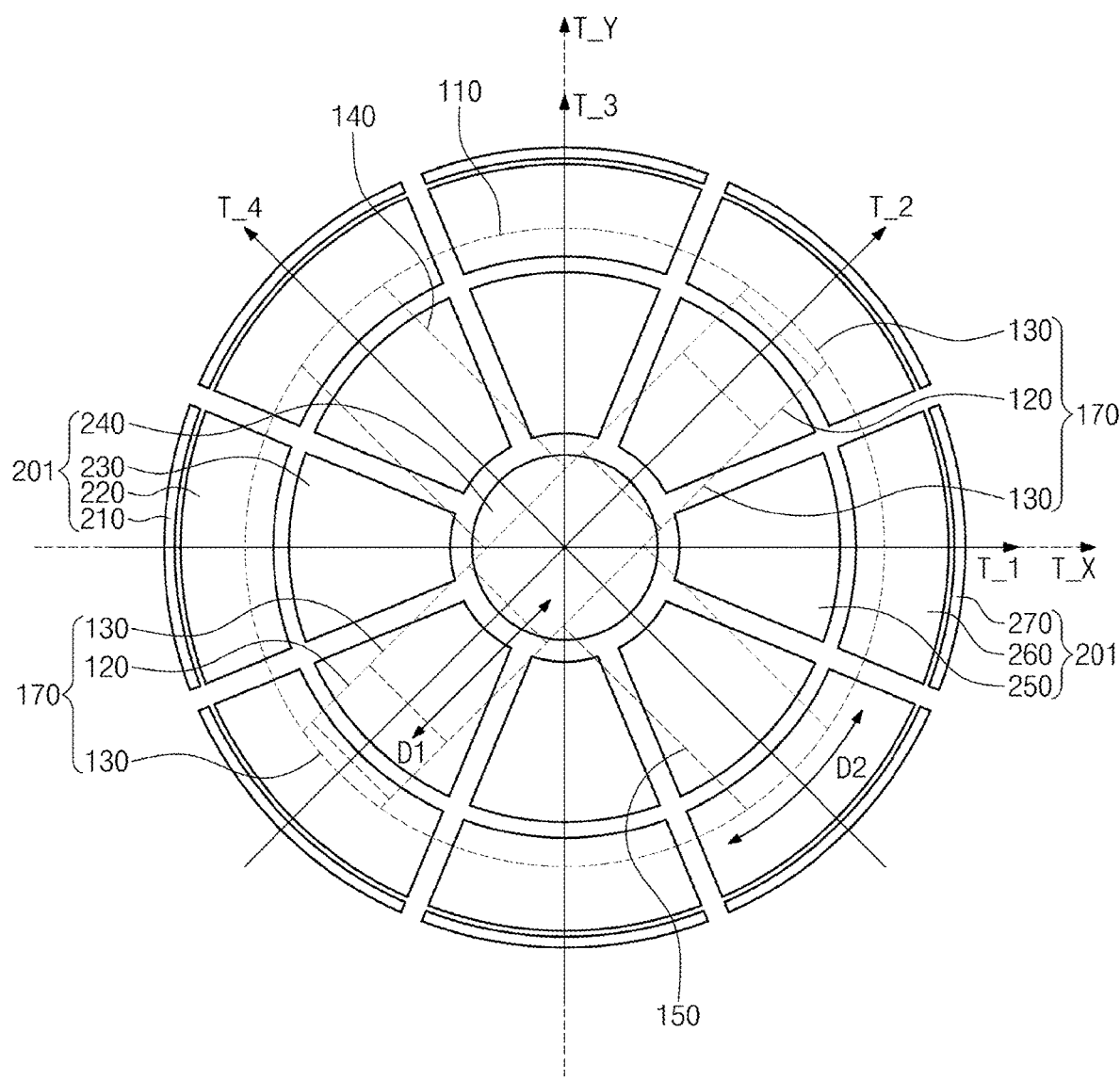
FIG. 3 is a diagram for describing operation of a spherical wheel motor according to an embodiment of the inventive concept.

FIG. 3 is a diagram for describing operation of the spherical wheel motor according to an embodiment of the inventive concept.

Referring to FIG. 3, a magnetic field may be generated by applying a current to each coil belt 201. In other words, a magnetic field may be generated by applying a current to the first to seventh coils 210 to 270. The magnetic field generated in each coil belt 201 may rotate the first axial magnet, the second axial magnet 150, and the rotary magnet belt 170. Accordingly, the rotor 100 may rotate.

The single coil belt 201 may generate a torque in one direction with respect to the rotary magnet belt 170. As shown, the four coil belts 201 may generate a first torque T_1, a second torque T_2, a third torque T_3, and a fourth torque T_4 with respect to the rotary magnet belt 170. An X-direction torque T_X and Y-direction torque T_Y may be derived according to magnitudes of the first to fourth torques T_1 to T_4 as expressed by Equation (1).

$$T\_X = T\_1 + T\_2 \cdot \cos 45° + T\_4 \cdot \cos 135° \; T\_Y = T\_2 \cdot \sin 45° + T\_3 + T\_4 \cdot \sin 135° \quad (1)$$

The magnitudes of the first to fourth torques T_1 to T_4 may be derived according to Equation (2) as below.

$$T\_(1\text{-}4) = ((I\_1 \cdot E\_1) + (I\_2 \cdot E\_2) + (I\_3 \cdot E\_3) + (I\_4 \cdot E\_4) + (I\_5 \cdot E\_5) + (I\_6 \cdot E\_6) + (I\_7 \cdot E\_7))/W\_m \quad (2)$$

In Equation (2), I_(1-7) denotes currents which respectively flow through the first to seventh coils 210 to 270 included in each coil belt 201, E_(1-7) denotes counter electromotive forces which respectively act on the first to seventh coils 210 to 270, and W_m denotes a rotational angular speed of the rotary magnet belt 170. The counter electromotive forces which respectively act on the first to seventh coils 210 to 270 may be generated due to rotation of the rotary magnet belt 170.

The counter electromotive forces acting on the first to seventh coils 210 to 270 may be derived according to Equation (3) as below.

$$E\_(1\text{-}7) = F\_(1\text{-}7) \cdot S\_(1\text{-}7) \quad (3)$$

In Equation (3), F_(1-7) denotes coefficients according to angles respectively formed between the first to seventh coils 210 to 270 and the rotary magnet belt 170 and the angular speed of the rotary magnet belt 170, and S_(1-7) denotes coefficients according to shapes of the first to seventh coils 210 to 270.

As described above, according to the first to fourth torques T_1 to T_4 acting on the rotary magnet belt 170, the rotary magnet belt 170 may rotate in the first direction D1 with the first axial magnet 140 and the second axial magnet as a central axis.

Aside from the first to fourth torques T_1 to T_4, a torque may be generated on the first axial magnet 140 and the second axial magnet 150 in the second direction D2 according to the magnetic fields generated in the first coils 210 and the seventh coils 270. Accordingly, the first axial magnet 140 and the second axial magnet 150 may rotate in the second direction D2 with the vertical axis C-C' (see FIGS. 1C and 2) of the rotor 100 as a central axis.

Since the first axial magnet 140 and the second axial magnet 150 rotate in the second direction D2, the rotary magnet belt 170 may rotate in the second direction with the vertical axis C-C' (see FIGS. 1C and 2) of the rotor 100 as a central axis. Therefore, a planar angle formed between the first direction D1, in which the rotary magnet belt 170 rotates, and the first to fourth torques T_1 to T_4 may change. As the angle formed between each of the first to fourth torques T_1 to T4 and the first direction D1, in which the rotary magnet belt 170 rotates, decreases, a rotational force applied to the rotary magnet belt 170 may increase.

As a result, the rotor 100 may rotate in the first direction D1 with the first axial magnet 140 and the second axial magnet 150 as a central axis, and may rotate in the second direction D2 with the vertical axis C-C' (see FIGS. 1C and 2) of the rotor 100 as a central axis.

FIGS. 4A to 4H are diagrams for describing the counter electromotive forces of the first to seventh coils generated due to rotation of the rotary magnet belt.

Figure 4A:
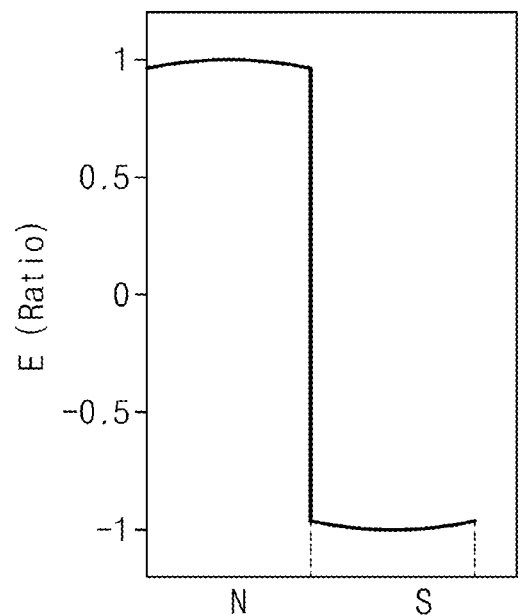
FIGS. 4A to 4H are diagrams for describing counter electromotive forces generated in coils due to rotation of a rotary magnet belt.
Figure 4B:
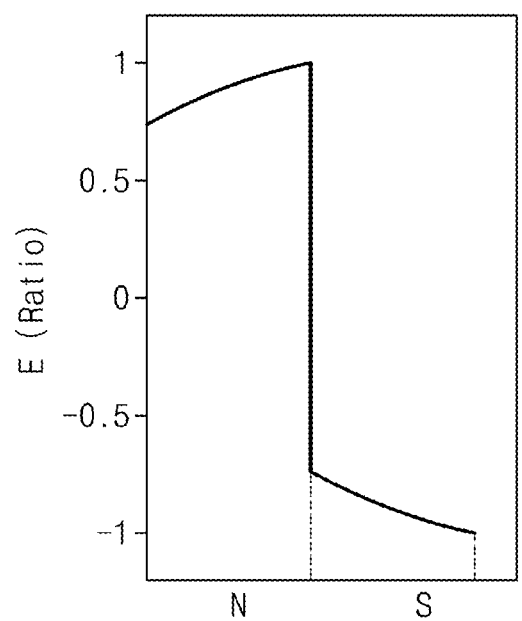
Figure 4C:
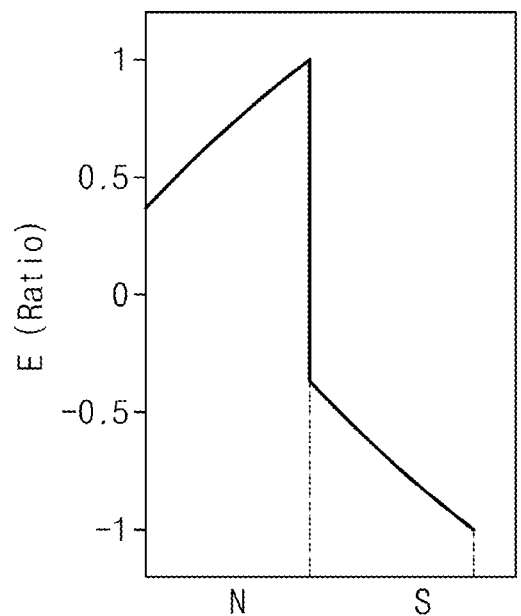
Figure 4D:
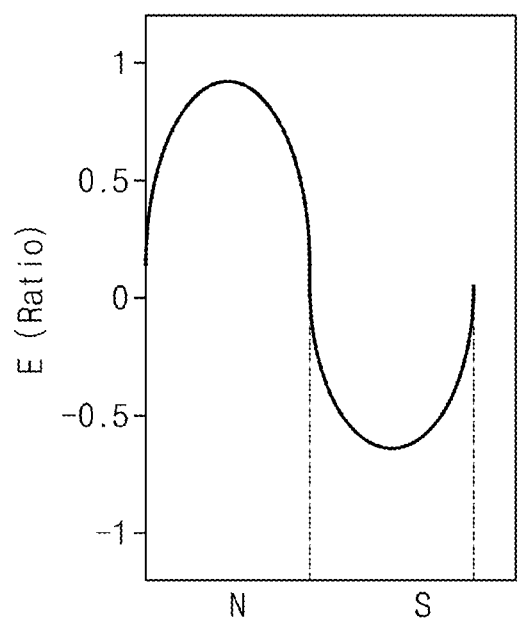
Figure 4E:
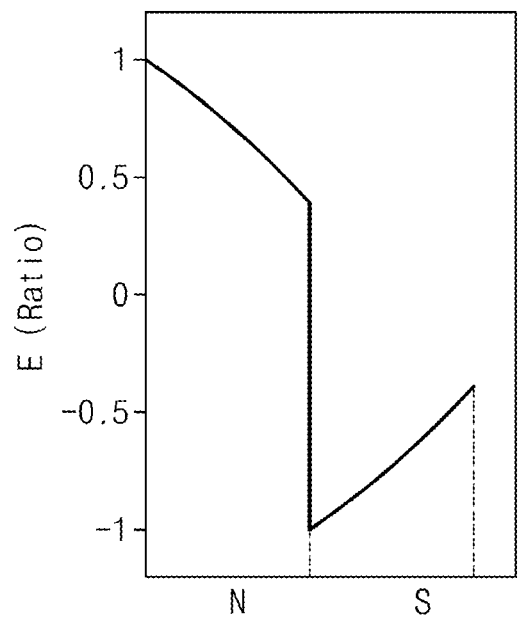
Figure 4F:
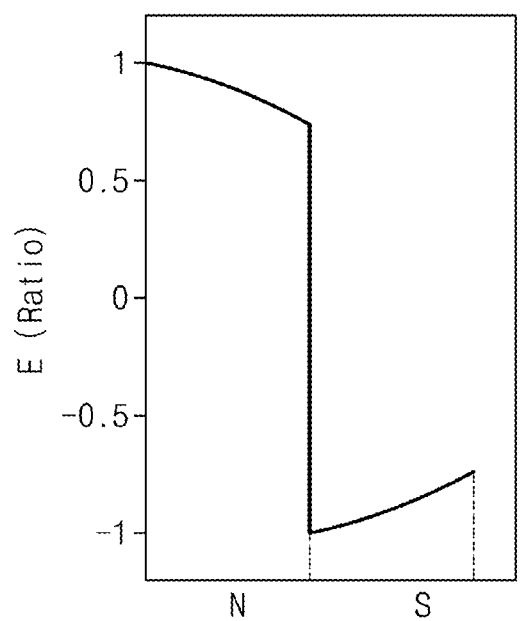
Figure 4G:
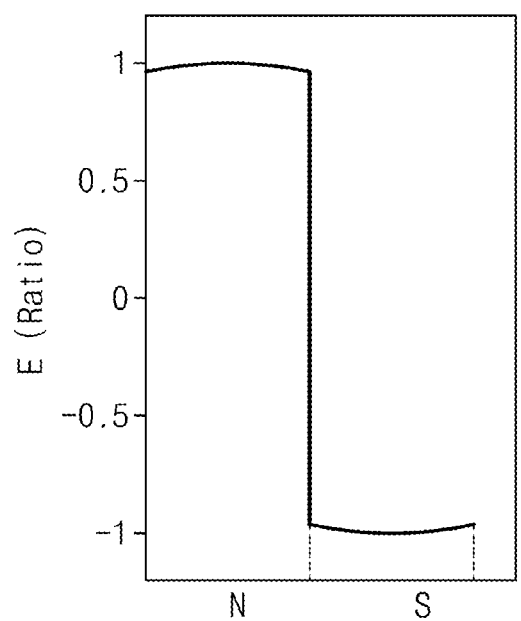
Figure 4H:
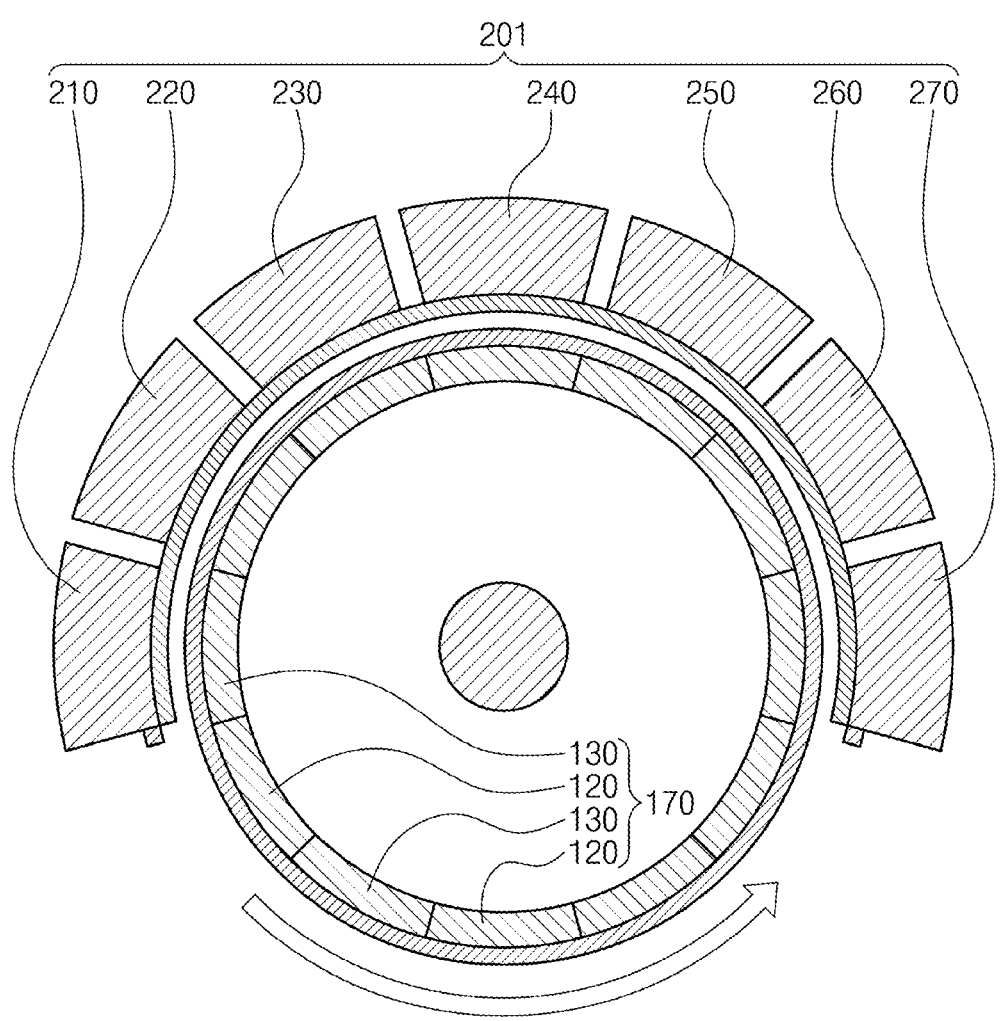

Referring to FIGS. 4A to 4H, when the rotary magnet belt 170 rotates in a certain direction in parallel with the single coil belt 201 as illustrated in FIG. 4H, the counter electromotive forces of the first to seventh coils 210 to 270 included in the coil belt 201 are illustrated in FIGS. 4A to 4G respectively. In FIGS. 4A to 4G, the vertical axis represents a direction and magnitude ratio of the counter electromotive force, and the horizontal axis represents a rotation angle of the rotary magnet belt 170. The horizontal axis shows a polarity of a magnet passing through a magnetic field generated in a coil, according to the rotation angle of the rotary magnet belt 170. For example, referring to FIG. 4C, the magnitude of the counter electromotive force generated when an N-pole magnet passes through a magnetic field, which is generated by the third coil 230 as the rotary magnet belt 170 rotates, increases gradually. The magnitude of the counter electromotive force generated when an S-pole magnet passes through the magnetic field generated by the third coil 230 increases gradually, and the direction of the counter electromotive force is opposite to the direction of the counter electromotive force generated when the N-pole magnet passes.

Figure 5A:
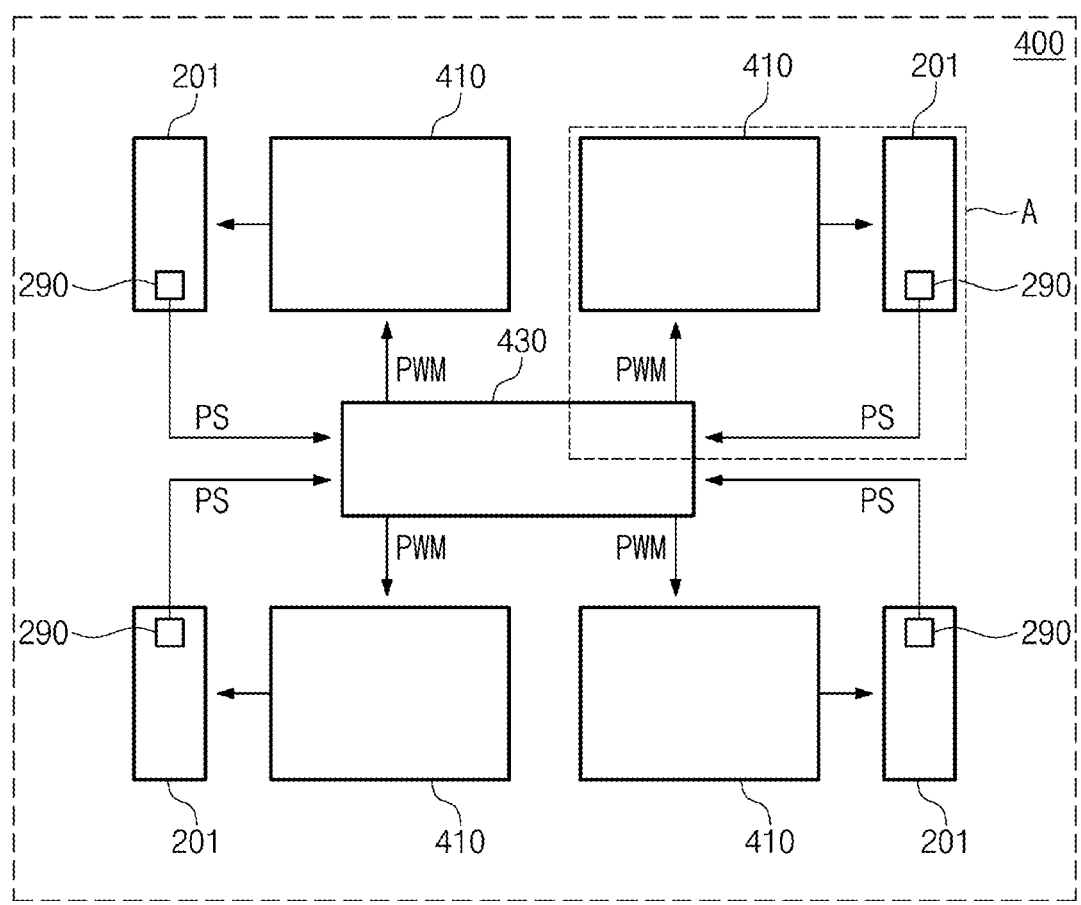
FIG. 5A is a block diagram for describing a first embodiment of a control system according to the inventive concept.
Figure 5B:
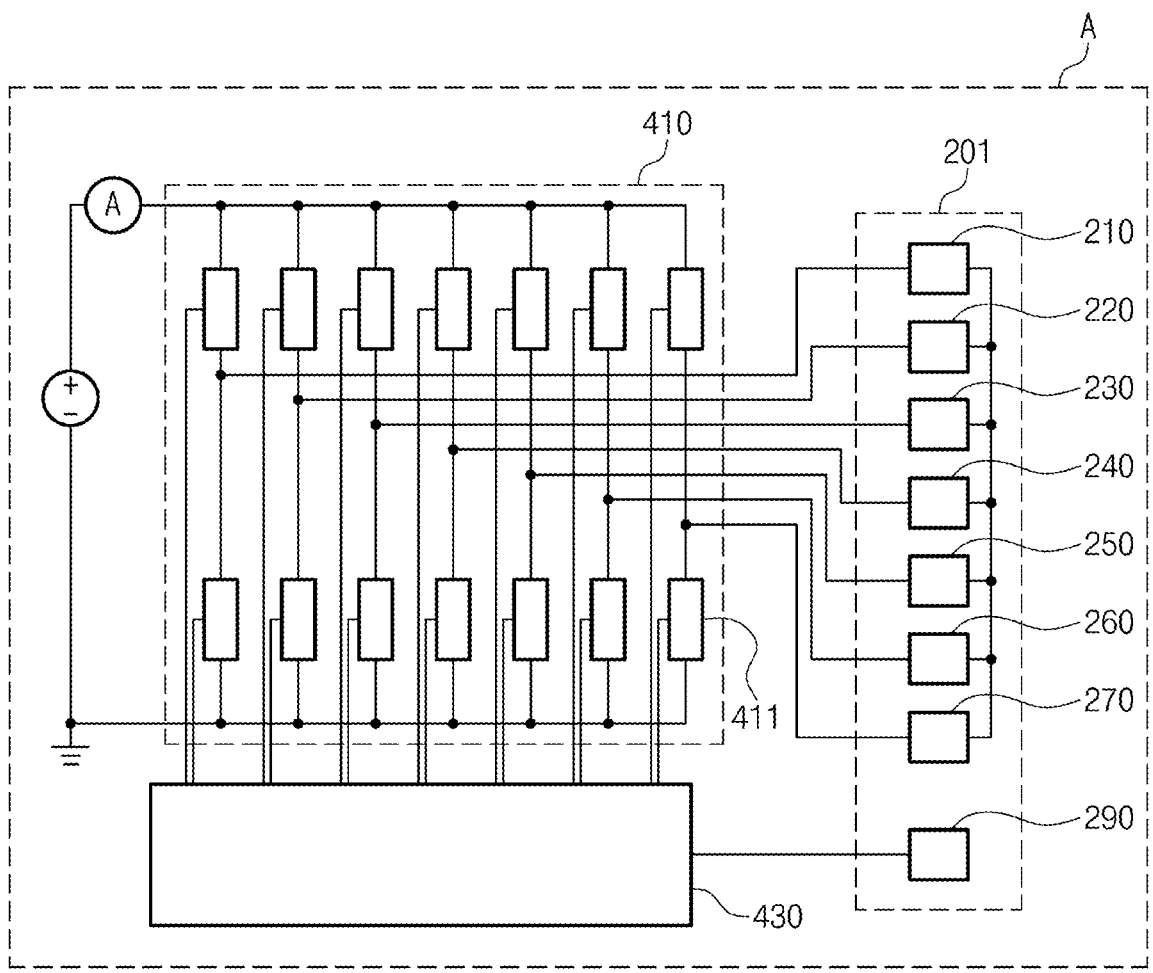
FIG. 5B is a detailed view of the region A of FIG. 5A.

FIG. 5A is a block diagram for describing a first embodiment of a control system according to the inventive concept, and FIG. 5B is a detailed view of the region A of FIG. 5A.

Referring to FIGS. 5A and 5B, the control system may include a control unit 400. The control unit 400 may include a plurality of multi-phase inverters 410 and a controller 430. The controller 430 may output a control signal to each multi-phase inverter 410. Each multi-phase inverter 410 may output a current signal to the first to seventh coils 210 to 270 included in the single coil belt 201. In this case, the plurality of multi-phase inverters 410 may output the current signal to the single fourth coil 240.

The controller 430 may output the control signal to the multi-phase inverters 410 on the basis of a position signal PS provided from the position detector 290. The controller 430 may calculate a magnitude of a current to be output to the first to the seventh coils 210 to 270. The controller 430 may include an MCU or the like for the calculation. The controller 430 may generate the control signal by performing a current magnitude calculation in order to rotate the rotor 100 in response to a command of a user. For example, the control signal may be a pulse width modulation (PWM) signal.

The multi-phase inverters 410 may convert a direct current signal generated by a direct current voltage source into an alternating current signal on the basis of the control signal to output the alternating current signal to the first to seventh coils 210 to 270. To this end, the multi-phase inverters 410 may include transistors 411. For example, two transistors 411 connected in series to each other may be defined as a transistor pair, and each multi-phase inverter 410 may include a plurality of transistor pairs connected in parallel. The number of transistor pairs may be equal to the number of coils. Each transistor 411 may include a variety of elements such as MOSFET, BJF, etc., but an embodiment of the inventive concept is not limited thereto. For example, the multi-phase inverters 410 may include a plurality of freewheeling diodes connected in parallel to the plurality of transistors 411. The plurality of freewheeling diodes may be configured to prevent the transistors 411 from being damaged by currents charged in the first to seventh coils 210 to 270.

The plurality of transistors 411 may be turned on or off on the basis of the control signal. The two transistors 411 included in a transistor pair may receive control signals inverted to each other. For example, one transistor 411 may receive a high level control signal so as to be turned on, and the other transistor 411 connected in series to the one transistor 411 may receive a low level control signal so as to be turned off. In this case, a low level current may be provided to a coil corresponding to the transistor pair. As described above, the first to seventh coils 210 to 270 may receive an alternating current in response to control by the multi-phase inverters 410.

Figure 6A:
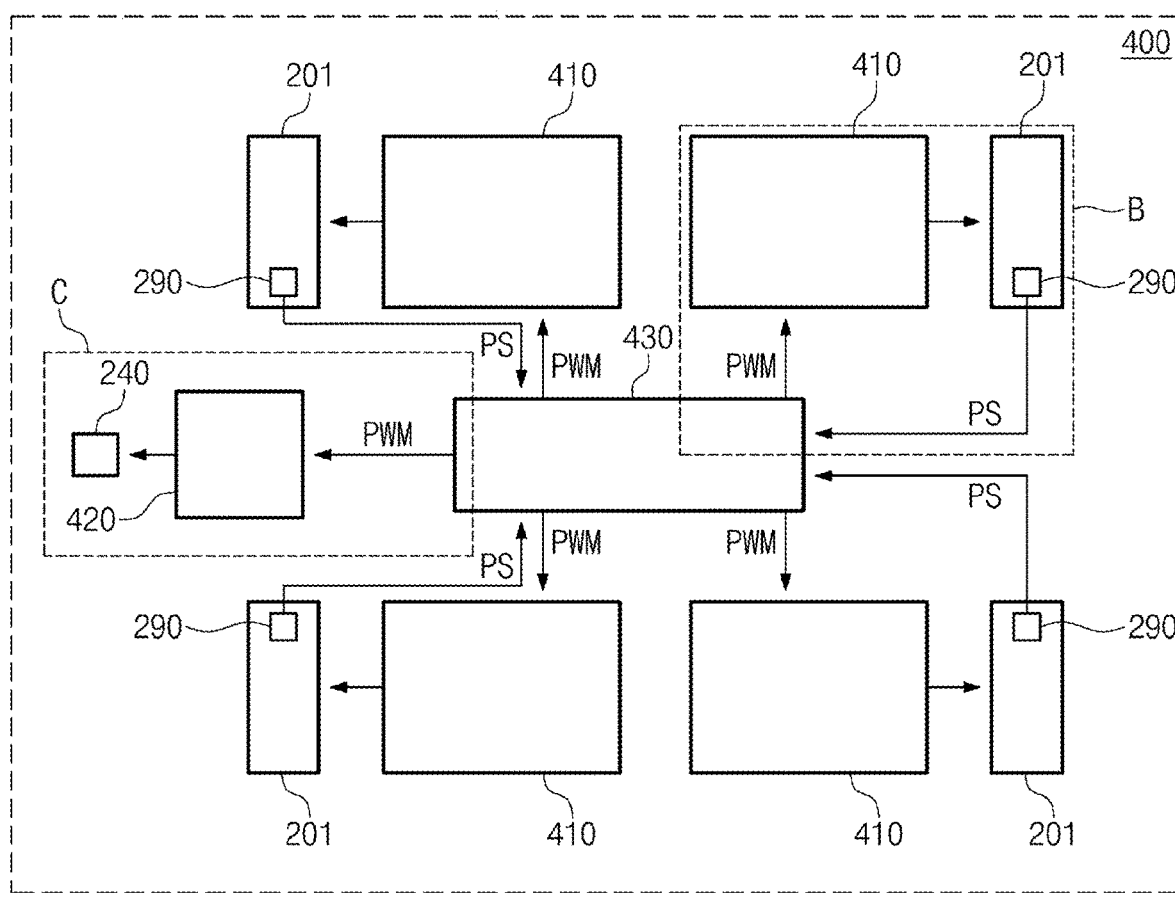
FIG. 6A is a block diagram for describing a second embodiment of a control system according to the inventive concept.
Figure 6B:
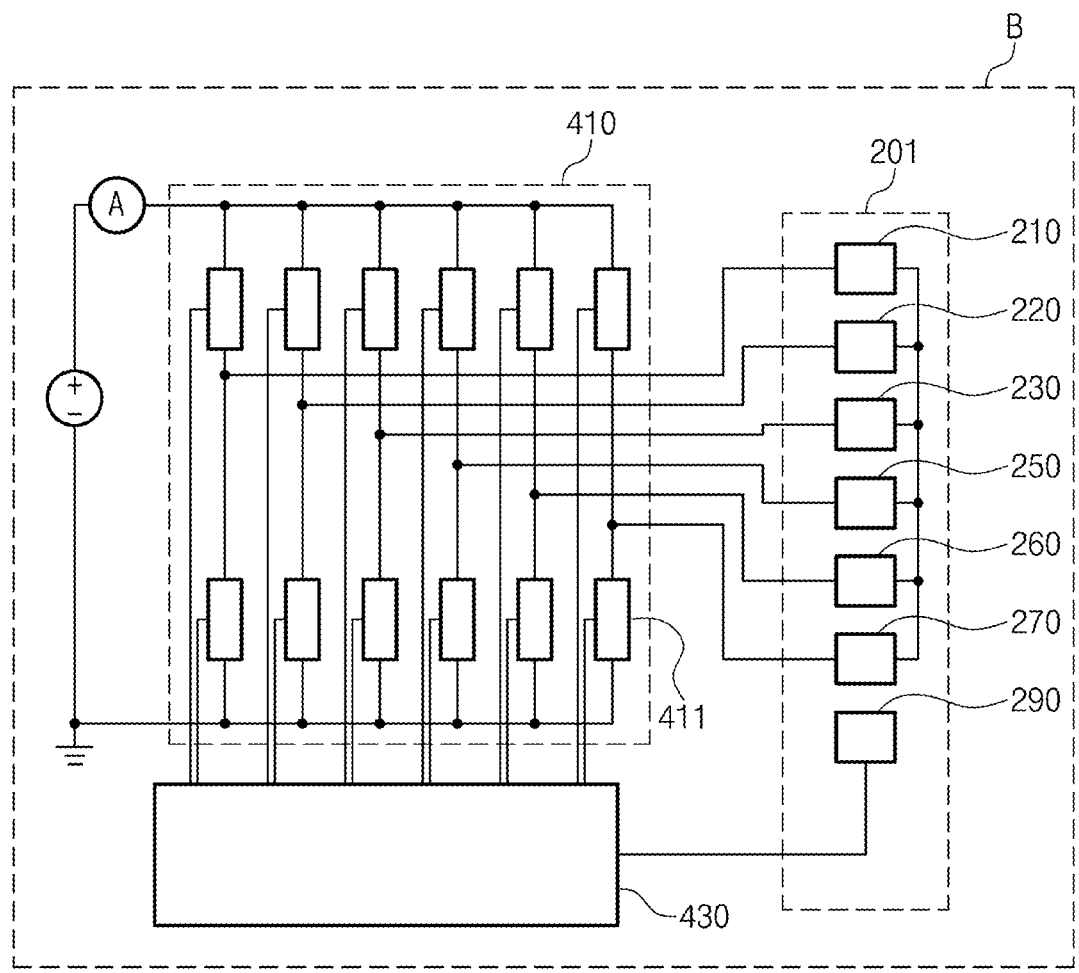
FIG. 6B is a detailed view of the region B of FIG. 6A.
Figure 6C:
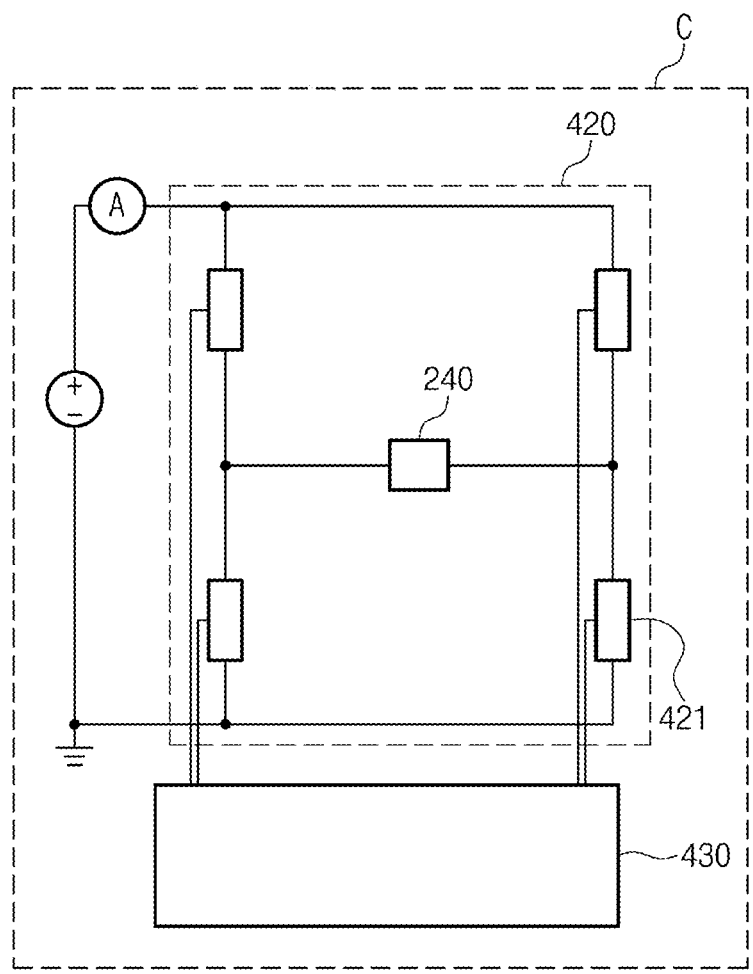
FIG. 6C is a detailed view of the region C of FIG. 6A.

FIG. 6A is a block diagram for describing a second embodiment of a control system according to the inventive concept, FIG. 6B is a detailed view of the region B of FIG. 6A, and FIG. 6C is a detailed view of the region C of FIG. 6A.

Referring to FIGS. 6A to 6C, the control system may include a control unit 400. The control unit 400 may include a plurality of multi-phase inverters 410 and a single-phase inverter 420. A controller 430 may output a control signal to each multi-phase inverter 410 and the single-phase inverter 420. Each multi-phase inverter 410 may output a current signal to the first to third coils 210 to 230 and the fifth to seventh coils 250 to 270 included in the single coil belt 201. The single-phase inverter 420 may output a current signal to the fourth coil 240.

The controller 430 may output the control signal to the multi-phase inverters 410 and the single-phase inverter 420 on the basis of a position signal PS provided from the position detector 290. The controller 430 may calculate a magnitude of a current to be output to the first to the seventh coils 210 to 270. The controller 430 may include an MCU or the like for the calculation. The controller 430 may generate the control signal by performing a current magnitude calculation in order to rotate the rotor 100 in response to a command of a user. For example, the control signal may be a pulse width modulation (PWM) signal.

The multi-phase inverters 410 may convert a direct current signal generated by a direct current voltage source into an alternating current signal on the basis of the control signal to output the alternating current signal to the first to third coils 210 to 230 and the fifth to seventh coils 250 to 270. To this end, the multi-phase inverters 410 may include transistors 411. Each multi-phase inverter 410 may include a plurality of transistor pairs connected in parallel. The number of transistor pairs may be equal to the number of coils. Each transistor 411 may include a variety of elements such as MOSFET, BJF, etc., but an embodiment of the inventive concept is not limited thereto. For example, the multi-phase inverters 410 may include a plurality of freewheeling diodes connected in parallel to the plurality of transistors 411. The plurality of freewheeling diodes may be configured to prevent the transistors 411 from being damaged by currents charged in the first to third coils 210 to 230 and the fifth to seventh coils 250 to 270.

The plurality of transistors 411 may be turned on or off on the basis of the control signal. The two transistors 411 included in a transistor pair may receive control signals inverted to each other. For example, one transistor 411 may receive a high level control signal so as to be turned on, and the other transistor 411 connected in series to the one transistor 411 may receive a low level control signal so as to be turned off. In this case, a low level current may be provided to a coil corresponding to the transistor pair. As described above, the first to third coils 210 to 230 and the fifth to seventh coils 250 to 270 may receive an alternating current in response to control by the multi-phase inverters 410.

The single-phase converter 420 may convert a direct current signal generated by a direct current voltage source into an alternating current signal on the basis of the control signal to output the alternating current signal to the fourth coil 240. To this end, the single-phase inverter 420 may include transistors 421. The single-phase inverter 420 may include two transistor pairs connected in parallel. Each transistor 421 may include a variety of elements such as MOSFET, BJF, etc., but an embodiment of the inventive concept is not limited thereto. For example, the single-phase inverter 420 may include a plurality of freewheeling diodes connected in parallel to the plurality of transistors 421. The plurality of freewheeling diodes may be configured to prevent the transistors 421 from being damaged by a current charged in the fourth coil 240.

The plurality of transistors 421 may be turned on or off on the basis of the control signal. The two transistors 421 included in a transistor pair may receive control signals inverted to each other. For example, one transistor 421 may receive a high level control signal so as to be turned on, and the other transistor 421 connected in series to the one transistor 421 may receive a low level control signal so as to be turned off. In this case, a low level current may be provided to a coil corresponding to the transistor pair. As described above, the fourth coil 240 may receive an alternating current in response to control by the single-phase inverter 420.

Figure 7A:
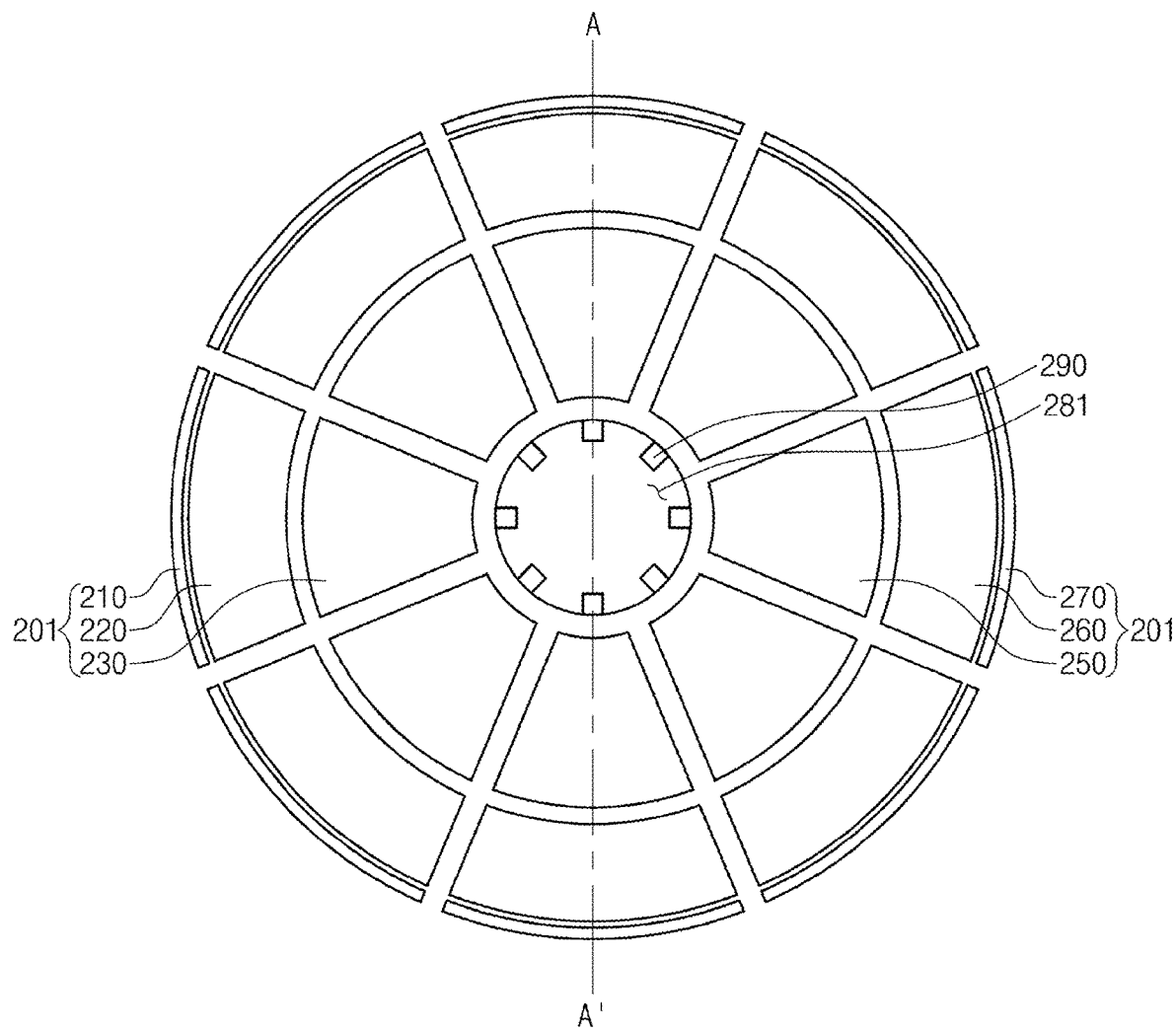
FIG. 7A is a planar view of a spherical wheel motor according to an embodiment of the inventive concept.
Figure 7B:
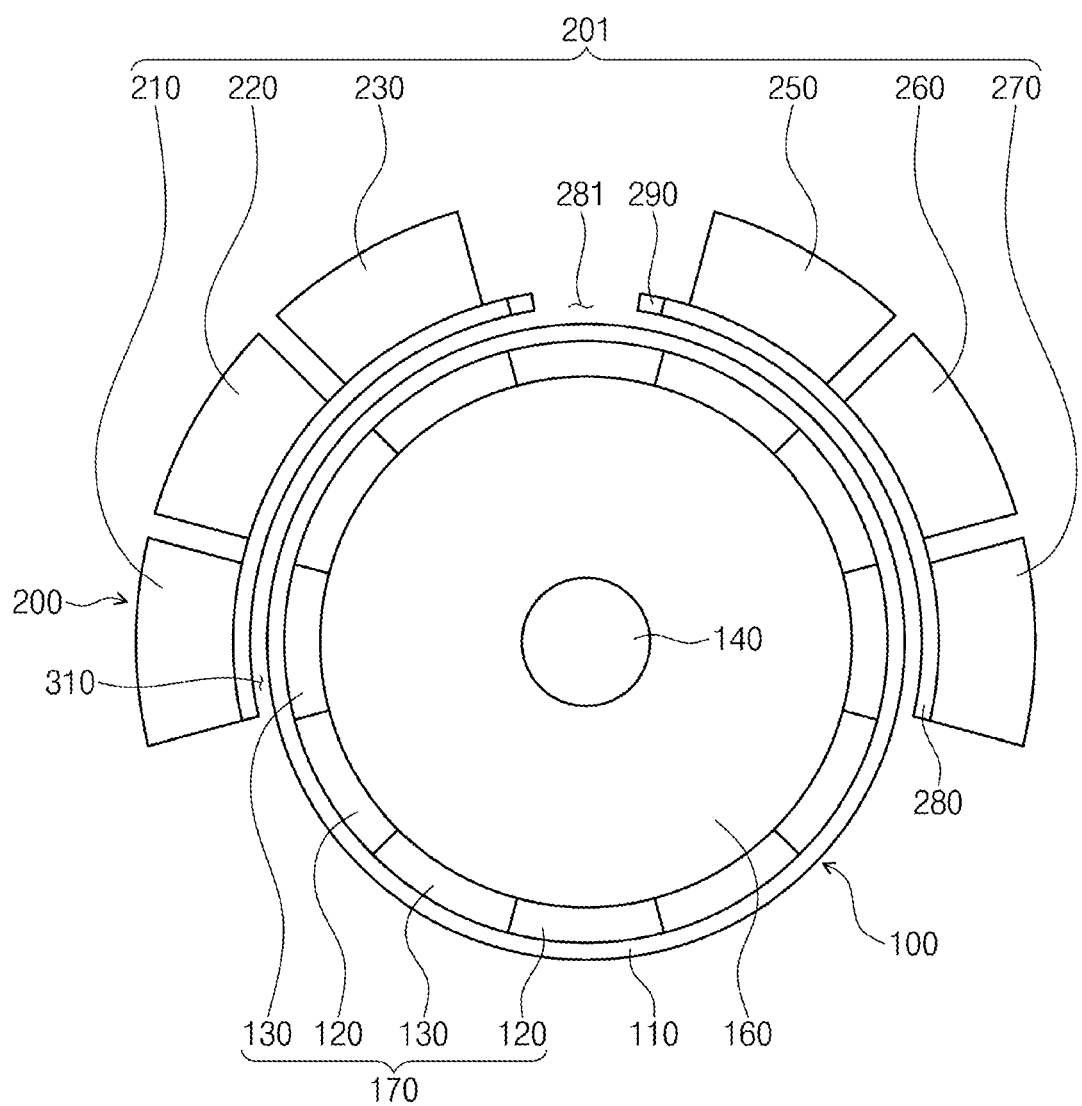
FIG. 7B is a cross-sectional view of the spherical wheel motor taken along line A-A' of FIG. 7A.

FIG. 7A is a planar view of a spherical wheel motor according to an embodiment of the inventive concept, and FIG. 7B is a cross-sectional view of the spherical wheel motor taken along line A-A' of FIG. 7A. For concise description, the same elements as described above with reference to FIGS. 1A to 1C and 2 are referred to by the same reference numerals, and overlapping descriptions are not provided.

Referring to FIGS. 7A and 7B, a base opening 281 may be provided to the uppermost part of the base 280 of the stator 200. The base opening 281 may pass through the base 280. The base opening 281 may be circular in a planar view. Each coil belt 201 may include first to third coils 210, 220, and 230 and fifth to seventh coils 250, 260, and 270 linearly arranged in a planar view.

The position detectors 290 may be provided in the base opening 281. The position detectors 290 may be provided on a sidewall of the base 280 exposed through the base opening 281. Eight position detectors 290 may be provided on the sidewall of the base 280. Each of the eight position detectors 280 may be arranged so as to correspond to directions in which eight coils 230 and 250 adjacent to the base opening 281 are arranged. In other words, the eight position detectors 290 may be radially arranged. The position detectors 290 may be one of a Hall sensor and a mouse sensor. The position detectors 290 may detect a position of the rotor 100 to provide a position signal PS to the controller 430 (see FIGS. 5A and 5B). Since the eight position detectors 290 are provided in the base opening 281, the position signal PS transferred to the controller 430 may be relatively precise, and a control signal output from the controller 430 to the multi-phase inverters 410 may be relatively precise.

Figure 8A:
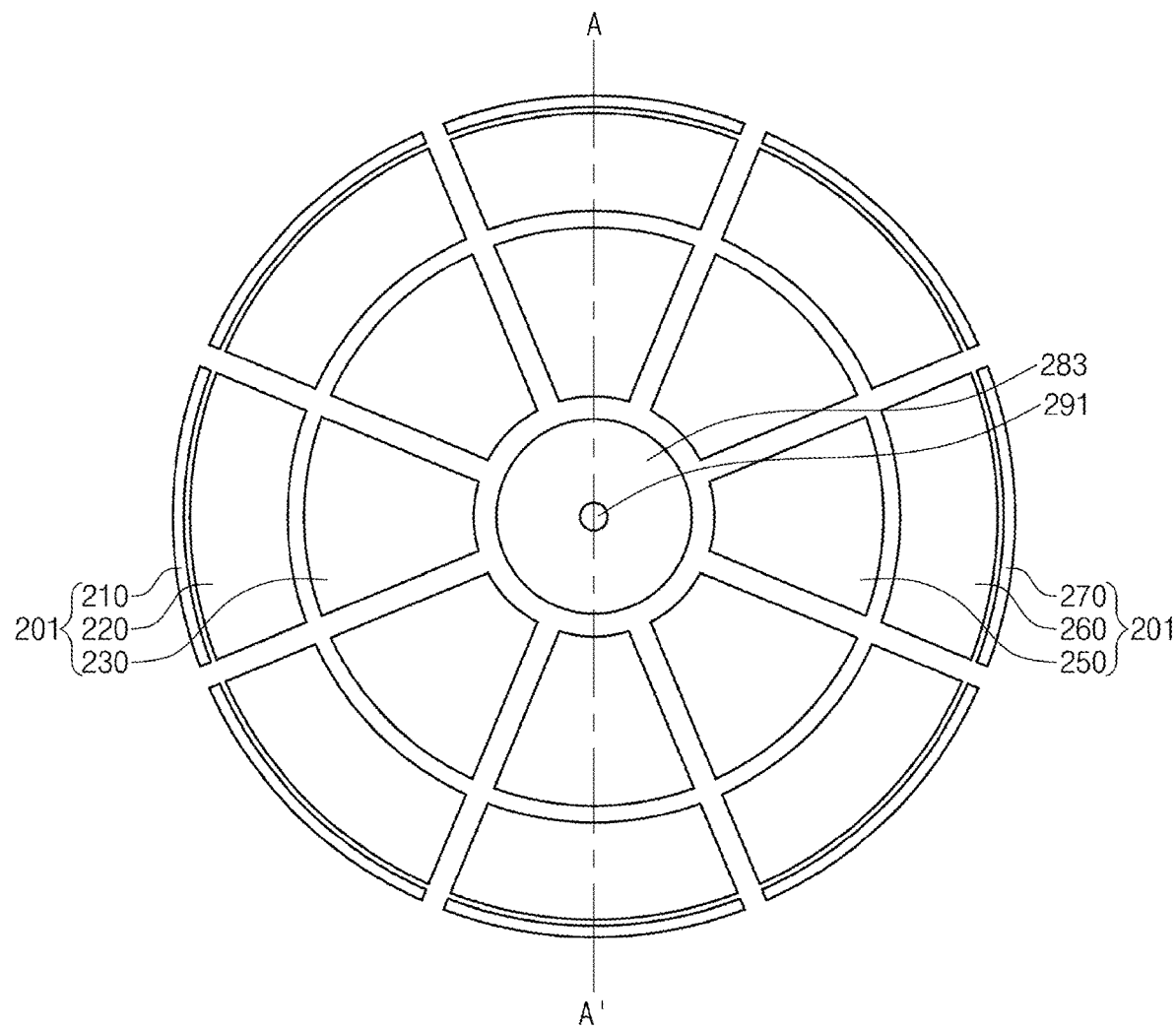
FIG. 8A is a planar view of a spherical wheel motor according to an embodiment of the inventive concept.
Figure 8B:
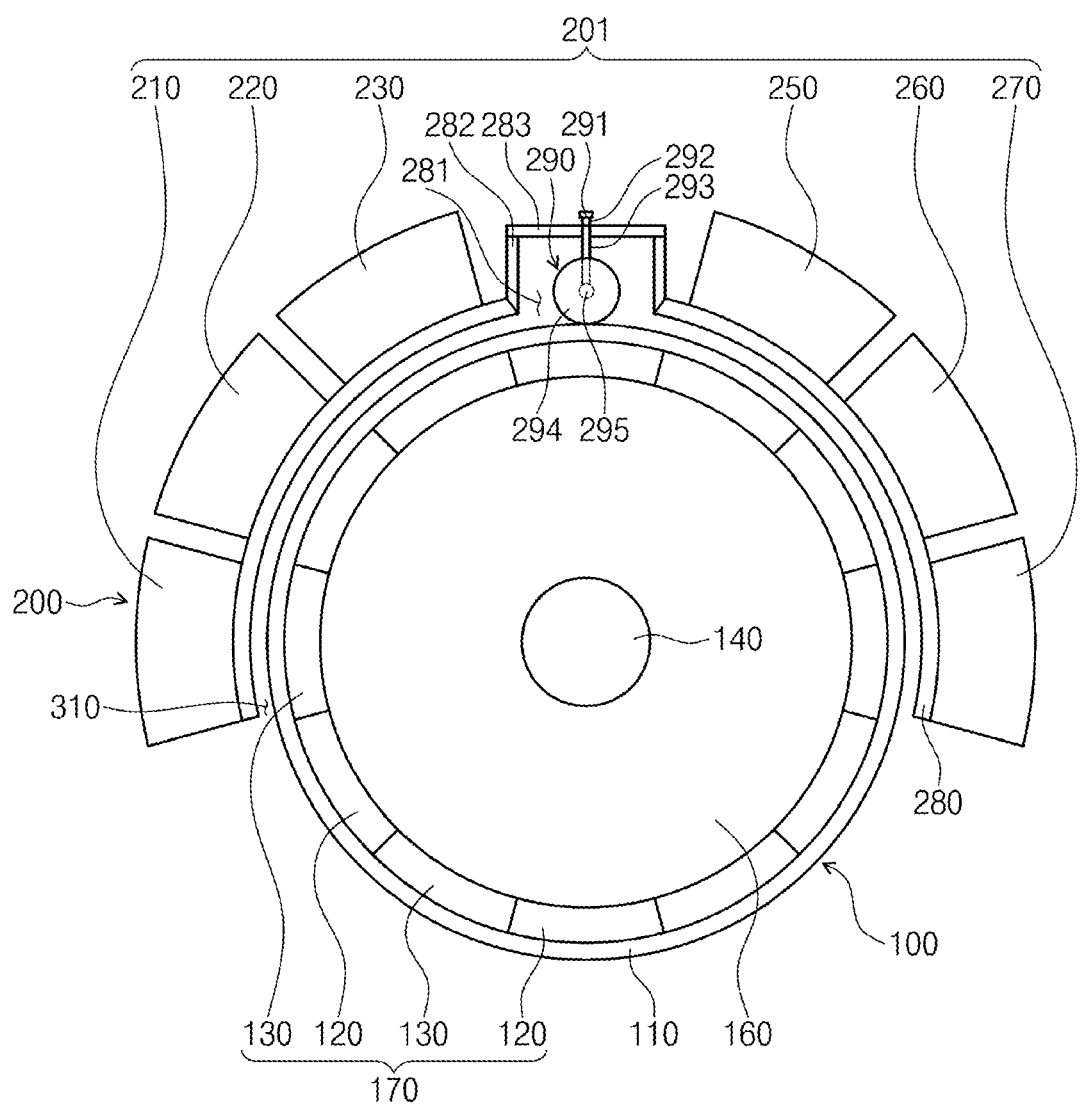
FIG. 8B is a cross-sectional view of the spherical wheel motor taken along line A-A' of FIG. 8A.
Figure 8C:
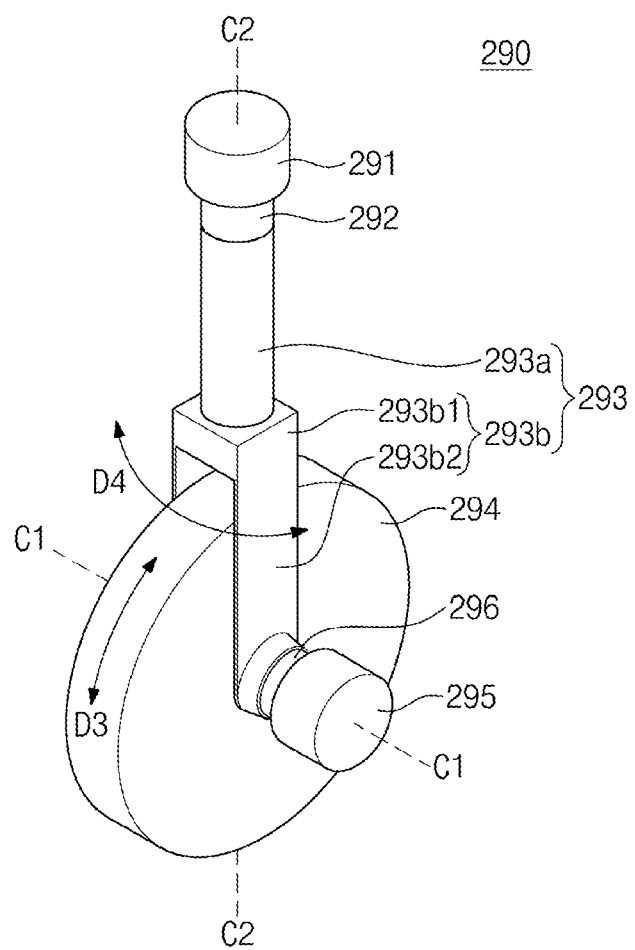
FIG. 8C is a diagram for describing the position detector of FIG. 8A.

FIG. 8A is a planar view of a spherical wheel motor according to an embodiment of the inventive concept, and FIG. 8B is a cross-sectional view of the spherical wheel motor taken along line A-A' of FIG. 8A, and FIG. 8C is a diagram for describing the position detector of FIG. 8A. The same elements as described above with reference to FIGS. 1A to 1C and 2 are referred to by the same reference numerals, and overlapping descriptions are not provided.

Referring to FIGS. 8A to 8C, the base opening 281 may be provided to the uppermost part of the base 280 of the stator 200. The base opening 281 may pass through the base 280. The base opening 281 may be circular in a planar view. Each coil belt 201 may include first to third coils 210, 220, and 230 and fifth to seventh coils 250, 260, and 270 linearly arranged in a planar view. The coil belts 201 may not overlap each other.

A support wall 282 connected to the sidewall of the base 280 exposed through the base opening 281 may be provided. A plate 283 may be provided on the support wall 282. The support wall 282 may support an edge of a lower surface of the plate 283. The plate 283 may have a shape of a circular plate, and the support wall 282 may have a shape of a circular pipe. The base opening 281 may be blocked from the outside by the support wall 282 and the plate 283.

The position detector 290 may be supported by the plate 283. The position detector 290 may include a first encoder 291, a first bearing 292, a connection part 293, a disk 294, a second encoder 295, and second bearings 296.

The disk 294 may have a circular plate shape. A circumferential surface of the disk 294 may contact the outer shell part 110 of the rotor 100. The disk 294 may contact the outer shell part 110 of the rotor 100 via the base opening 281. The second bearing 296 may be provided on both sides of the disk 294. One of the second bearing 296 may be connected to the second encoder 295. The connection part 293 may be provided on the disk 294. The connection part 293 may include an upper part 293*a* and a lower part 293*b*. The lower part 293*b* of the connection part 293 may include a first part 293*b*1 connected to the upper part 293*a* and second parts 293*b*2 extending from the first part 293*b*1. The disk 294 may be provided between the second parts 293*b*2. Each of the second parts 293*b* may be connected to the second bearing 296. The upper part 293*a* of the connection part 293 may pass through the plate 283. The first bearing 292 may be provided on the upper part 293a of the connection part 293. The first bearing 292 may be connected to the first encoder 291.

The position detectors 290 may detect the position of the rotor 100. A method for detecting the position of the rotor 100 by the position detector 290 is described below. When the rotor 100 rotates, the disk 294 may rotate due to friction between the outer shell part 110 and the disk 294. The disk 294 may rotate in a third direction D3 with a first axis C1 parallel with the circumferential surface of the disk 294 as a central axis, and may rotate in a fourth direction D4 with a second axis C2 perpendicular to the first axis C1 as a central axis. When the disk 294 rotates in the third direction D3, the second encoder 295 may detect the rotation of the disk 294 to obtain rotation information. When the disk 294 rotates in the fourth direction D4, the connection part 293 may rotate in the fourth direction D4. When the connection part 293 rotates in the fourth direction D4, the first encoder 291 may detect the rotation of the connection part 293 to obtain rotation information. The position of the rotor may be detected on the basis of the rotation information of the first and second encoders 291 and 295. The position detector 290 may provide the position signal PS to the controller 430 (see FIGS. 5A and 5B). Since the position detector 290 including the first and second encoders 291 and 295 is provided, the position signal PS transferred to the controller 430 may be relatively precise, and a control signal output from the controller 430 to the multi-phase inverters 410 may be relatively precise.

The spherical wheel motor according to an embodiment of the inventive concept includes axial magnets and a rotary magnet belt, and thus has excellent rotational motion force and rotational controllability.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. A spherical wheel motor comprising:
a spherical rotor; and
a stator surrounding an upper surface of the rotor,
wherein the rotor comprises a spherical outer shell part, a first axial magnet extending in a horizontal direction in the outer shell part, a second axial magnet extending in the horizontal direction and facing the first axial magnet, and a rotary magnet belt provided in a form of a belt with the first axial magnet and the second axial magnet as a central axis,
wherein the rotary magnet belt comprises a plurality of first rotary magnets and a plurality of second rotary magnets arranged alternately,
wherein the stator comprises a base surrounding the upper surface of the rotor and coil belts provided in plurality on the base to intersect with each other on an uppermost part of the base,
wherein the coil belts comprise a plurality of coils.
2. The spherical wheel motor of claim 1, wherein the rotor further comprises an interposed part in the outer shell part, wherein the interposed part comprises the same material as the outer shell part.
3. The spherical wheel motor of claim 1, wherein the rotor further comprises an interposed part in the outer shell part, wherein the interposed part is a substantially empty space.

4. The spherical wheel motor of claim 1, wherein the first axial magnet and the second axial magnet contact each other.
5. The spherical wheel motor of claim 1, wherein each of the first rotary magnets and each of the second rotary magnets contact each other.
6. The spherical wheel motor of claim 1, wherein each of the coil belts comprises a third coil on the uppermost part of the base.
7. The spherical wheel motor of claim 1, wherein the rotor and the stator are separated from each other.
8. The spherical wheel motor of claim 1, further comprising a bearing provided between the rotor and the stator.
9. The spherical wheel motor of claim 1, wherein the first axial magnet is an N-pole magnet, and the second axial magnet is an S-pole magnet.
10. The spherical wheel motor of claim 1, wherein each of the first rotary magnets is an N-pole magnet, and each of the second rotary magnets is an S-pole magnet.
11. The spherical wheel motor of claim 1,
wherein each of the coil belts comprises a first coil and a second coil positioned at both ends thereof,
wherein an uppermost part of the first coil and an uppermost part of the second coil are positioned at higher levels than an uppermost part of the first axial magnet and an uppermost part of the second axial magnet,
wherein a lowermost part of the first coil and a lowermost part of the second coil are positioned at lower levels than a lowermost part of the first axial magnet and a lowermost part of the second axial magnet.
12. The spherical wheel motor of claim 11, further comprising a position detector connected to the first coil or the second coil.
13. A spherical wheel motor comprising:
a spherical rotor; and
a stator surrounding an upper surface of the rotor,
wherein the rotor comprises a spherical outer shell part, a first axial magnet extending in a horizontal direction in the outer shell part, a second axial magnet extending in the horizontal direction and facing the first axial magnet in the outer shell part, and a rotary magnet belt provided in a form of a belt with the first axial magnet and the second axial magnet as a central axis in the outer shell part,
wherein the rotary magnet belt comprises a plurality of first rotary magnets and a plurality of second rotary magnets arranged alternately,
wherein the stator comprises: a base surrounding the upper surface of the rotor; and coil belts provided in plurality on the base,
wherein the coil belts comprise a plurality of coils.
14. The spherical wheel motor of claim 13, wherein the base comprises a base opening provided to an uppermost part of the base.
15. The spherical wheel motor of claim 14, further comprising position detectors provided on a sidewall of the base exposed through the base opening.
16. The spherical wheel motor of claim 15, wherein the position detectors are arranged so as to correspond to directions in which the coils adjacent to the base opening are arranged.
17. The spherical wheel motor of claim 14, further comprising a rotation detector comprising a disk contacting the outer shell part through the base opening.
18. The spherical wheel motor of claim 17,
wherein the disk is capable of rotating in a first direction with an axis parallel with a circumferential surface of the disk as a central axis, wherein the rotation detector further comprises a first encoder provided beside the disk,
wherein the first encoder detects the rotation of the disk in the first direction to obtain rotation information.

19. The spherical wheel motor of claim 18,
wherein the disk is capable of rotating in a second direction intersecting with the first direction,
wherein the rotation detector further comprises a second encoder provided on the disk,
wherein the second encoder detects the rotation of the disk in the second direction to obtain rotation information.

20. The spherical wheel motor of claim 19,
wherein the rotation detector further comprises a connection part connecting the disk and the second encoder,
wherein the disk is provided between portions of the connection part.

* * * * *